United States Patent [19]

Isobe et al.

[11] 4,346,392

[45] Aug. 24, 1982

[54] PLOTTING HEAD FOR USE IN DRAWING MACHINE

[75] Inventors: Taketo Isobe; Terumi Matsushita, both of Chigasaki, Japan

[73] Assignee: Mutoh Industry Ltd., Tokyo, Japan

[21] Appl. No.: 137,328

[22] Filed: Apr. 4, 1980

[30] Foreign Application Priority Data

| | | | |
|---|---|---|---|
| Apr. 12, 1979 | [JP] | Japan | 54-44551 |
| Oct. 26, 1979 | [JP] | Japan | 54-139016 |
| Oct. 26, 1979 | [JP] | Japan | 54-139017 |
| Feb. 6, 1980 | [JP] | Japan | 55-13233 |
| Feb. 6, 1980 | [JP] | Japan | 55-13234 |
| Feb. 6, 1980 | [JP] | Japan | 55-13235 |
| Feb. 6, 1980 | [JP] | Japan | 55-13687[U] |
| Feb. 6, 1980 | [JP] | Japan | 55-13688[U] |

[51] Int. Cl.[3] G01D 15/24

[52] U.S. Cl. 346/139 C; 33/18 R; 33/1 M; 401/67

[58] Field of Search 33/1 M, 18 R; 346/139 R, 139 C; 401/65, 67

[56] References Cited

U.S. PATENT DOCUMENTS

| | | | |
|---|---|---|---|
| 3,293,658 | 12/1966 | Sicking | 346/139 R |
| 3,345,640 | 10/1967 | Sicking | 346/139 R |
| 3,939,482 | 2/1976 | Cotter | 346/139 C |
| 3,971,036 | 7/1976 | Gerber et al. | 346/139 C |
| 4,015,269 | 3/1977 | Edo | 346/139 C |
| 4,091,393 | 5/1978 | Masuyama et al. | 346/139 C |

*Primary Examiner*—William D. Martin, Jr.

*Attorney, Agent, or Firm*—Blanchard, Flynn, Thiel, Boutell & Tanis

[57] ABSTRACT

A plotting head for use in a drawing machine comprising a housing attached to said drawing machine; a lead holding means installed for vertical movement within said housing and having a vertical through hole; a bias means disposed above said lead holding means and imparting it a continuous descending tendency; a long cover means covering said bias means; a chuck means disposed for vertical movement in the through hole of said lead holding means, provided with a vertical lead inserting hole and having at the lower part a collet portion arranged to shut for clamping the lead and open for releasing the lead depending upon the vertical movement of said chuck means; a gripping means disposed for vertical movement on the bottom wall of said housing and operating to grip the top of the lead; and an actuating means operating to allow said lead holding means to ascend against the force of said bias means.

20 Claims, 22 Drawing Figures

PLOTTING HEAD FOR USE IN DRAWING MACHINE

BACKGROUND OF THE INVENTION

This invention relates to a plotting head for use in a drawing machine, in particular a rectangular coordinates type drawing machine.

In the conventional rectangular coordinates type drawing machine, the plotting head has been constructed to have a rotary board mounted rotatably on a Y cursor and provided with a plurality of lead holders thereon, and has been so operated that when the lead received in one lead holder is used up, the rotary plate is rotated for locating another lead holder in a drawing position and the fresh lead received therein is used in succession.

The thus constructed plotting head is defective in that since the means for locating the rotary plate properly and the lead feeding means are respectively operated by different operating means, the mechanism is very complicated and additionally it is very difficult to locate the rotary board accurately.

Further, the conventional plotting head is defective in that since the lead holder can receive only a short lead of a length of about 60 mm at the most, a plurality of lead holders must be installed and consequently the line drawn with one lead accurately conforms, only with difficulty, to that drawn with another lead.

SUMMARY OF THE INVENTION

This invention provides a plotting head which can eliminate the above mentioned defects inherent in the conventional plotting heads.

In more detail, this invention is characterized in that a lead holding means having a vertical through hole is installed for vertical movement within a housing; a chuck means having a vertical lead inserting holder is disposed for vertical movement in the through hole; said chuck means is provided at the lower part with a collet portion arranged to be compressed for clamping the lead and expanded for releasing the lead depending upon the vertical movement of said chuck means within the lead holding means; said housing further includes a bias means functioning to impart to said lead holding means a continuous lowering tendency and a long cover means wherein for covering said bias means, into said cover means there is inserted from above a lead whose lower end is arranged to be gripped by a lead top gripping means mounted for vertical movement on the bottom wall of said housing; and further an actuating means is provided for raising said lead holding means having once been lowered by said bias means.

An object of this invention is to provide a plotting head characterized in that the lead holding means descends accompanying the chuck means for making up for the consumed portion of the lead and when the consumed portion reaches a predetermined length the lead holding means is operated by the actuating means to ascend accompanying the chuck means for clamping the lead at its another part newly by means of the chuck means and making up for the consumed portion of the lead by repeating the above mentioned procedure, and further in that the provision of the cover means covering the bias means thereabove permits the use of a long lead, for instance, of 200–300 mm which has been impossible up to now.

A further object of this invention is to provide a plotting head characterized in that the possibility of using such long leads consequently prolongs the drawing time per one and the same lead and accordingly reduces the superfluous time required for exchanging the lead and additionally that the mechanism is simplified and the operation of the mechanism required for high accurate conformity between drawn lines can be dispensed with.

A still further object of this invention is to provide a plotting head characterized in that the lead fitting operation becomes unnecessary by lowering the lead as it is consumed; when the descending distance reaches a predetermined dimension the chuck is released from the lead and allowed to ascend to re-clamp the lead at its another part; and the time when the lead now on use becomes shorter than a predetermined dimension and accordingly must be replaced by a new one is signalled and etc., and further that the operations of associated members are all dealt with automatically and therefore handworking becomes entirely unnecessary in this case.

Another object of this invention is to provide a plotting head characterized in that since the fitted lead is covered throughout the total length with a protective means and so is not exposed to the outside, there is no possibility of its being damaged by outside force.

Still another object of this invention is to provide a plotting head characterized in that the rest lead, in other words the lead shortened within the plotting head and unused for drawing purposes, can be made as short as possible and further that the rest lead can be discharged very easily.

Yet other objects of this invention will become apparent from the following description with reference to the accompanying drawings.

DETAILED DESCRIPTION OF THE PREFERRED EMBODIMENT

Figure 1:
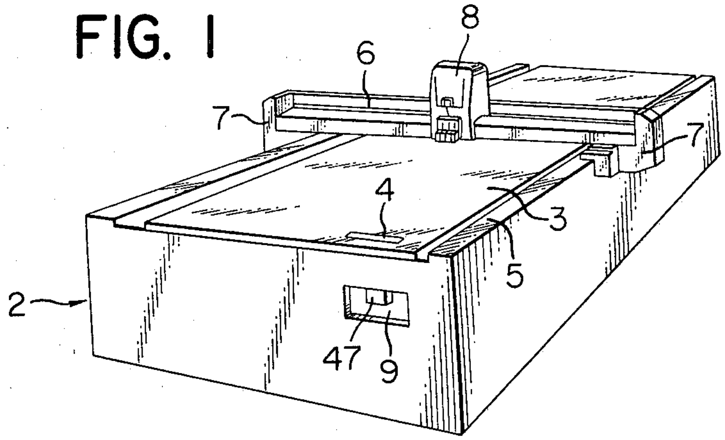
FIG. 1 is a perspective view of one embodiment of the rectangular coordinates type drawing machine provided with a plurality of plotting heads according to this invention.
Figure 2:
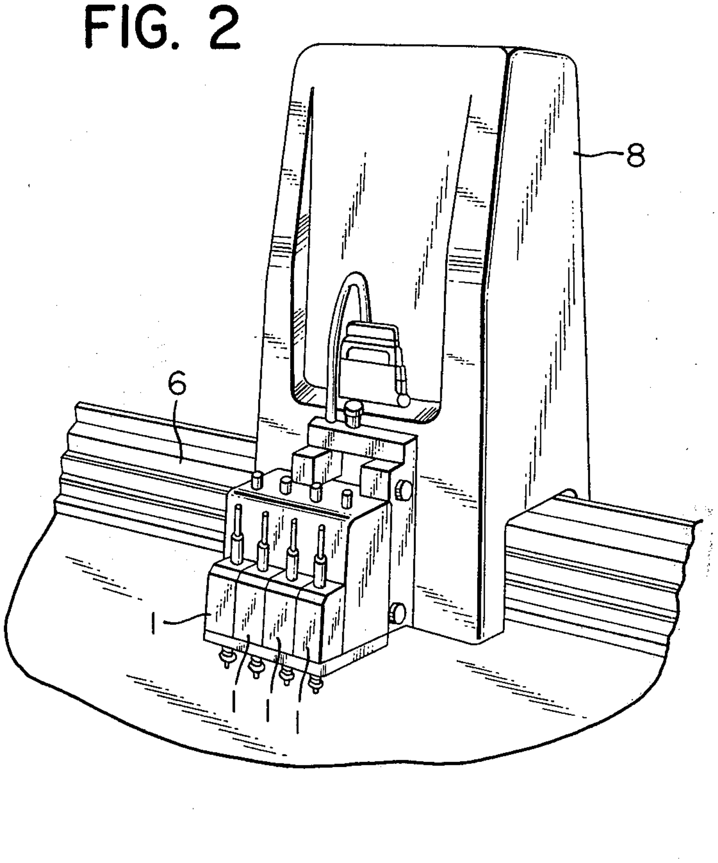
FIG. 2 is an enlarged perspective view of the running head portion illustrated in FIG. 1.

In FIG. 1 and FIG. 2, numeral 2 denotes one embodiment of the drawing machine provided with a plurality of plotting heads 1 of this invention.

In this drawing machine, a rest lead inlet 4 is perforated in a drafting plate 3 disposed at the upper part of the drawing machine and a handling opening 9 is perforated in the side wall thereof. An X-axis rail 5 is provided on both sides of said drafting plate 3 respectively, a Y-axis rail 6 is provided in the direction of intersecting with said rail, an X cursor 7 supporting each end of said rail 6 is provided movably on the rail 5, and a running head 8 is provided movably on the rail 6. The cursor 7 and head 8 include a pulse motor or servomotor which is rotated by a pulse signal generated from a pulse oscillator (not shown) and operates to move the cursor 7 and head 8 to a needed position. And a necessary number of plotting heads 1 are attached to the head 8.

It is to be understood that various modifications naturally may be made, for instance, rest lead removing means may be omitted, a system may be employed where paper is adapted to move on the drafting plate or the like.

Hereinafter, the first embodiment through the fifth embodiment will be detailed with reference to the respective drawings. It is to be noted that in each embodiment the same symbol will be attached to the same member, in the succeeding embodiments explanation will be omitted with reference to the same member which has already been explained in the preceding embodiments, and explanation will be made mainly on different members.

First embodiment

FIG. 3 to FIG. 8 illustrate the first embodiment of the plotting head according to this invention.

A plotting head 1 includes a housing 11, and a guide pipe 13, into which a lead holder 14 is slidably fitted, is attached detachably to a base plate 12 by means of a set bolt 25.

Figure 6:
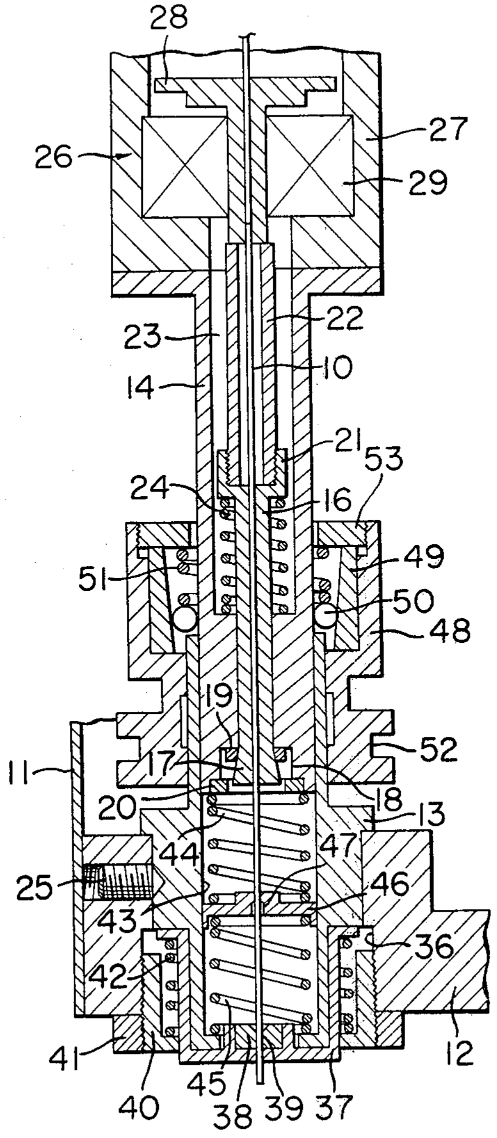
FIG. 6 is an enlarged sectional view of the lead holder, chuck, clutch, solenoid, etc. illustrated in FIG. 3.

The lead holder 14, as is clearly seen especially from FIG. 6, is slidingly fitted with the lower part of a longitudinal fastener 16 having a center long hole into which a lead 10 is inserted. The lower end of the fastener 16 is formed into a downwardly expanded tapered collet portion 17 and this collet portion 17 is provided with several longitudinal slits (not shown). The collet portion 17 is positioned within a recess 18 disposed at the lower face of the lead holder 14. A clamping ring 19 is fitted on the outer circumferential face of the collet portion, said clamping ring having an inner tapered face adapted to fit thereon. A stopper ring 20, against which the ring 19 abuts, is attached to the lower end edge of the recess 18. The upper part of the fastener 16 is disposed in an enlarged hole 23 of the lead holder 14 and the upper end thereof is formed into an enlarged portion 21. The inside surface of the enlarged portion 21 is threaded and the lower end of an auxiliary guide pipe 22 is screwed into this thread. The fastener 16 may be integral with the enlarged portion 21. Between the lower face of the enlarged portion 21 and the bottom face of the enlarged hole 23 is provided a spring 24 which is adapted to continuously urge the fastener 16 upwardly.

Next, on the upper end of the lead holder 14 is mounted a casing 27 which receives a third solenoid 26 responding to the sensing means to be mentioned hereinafter. The leg portion of a T shaped actuator 28 of this solenoid 26 passes through a coil 29 with its lower end abutting on the upper end of the guide pipe 22, and the lead 10 passes through the central part of the leg portion.

Figure 3:
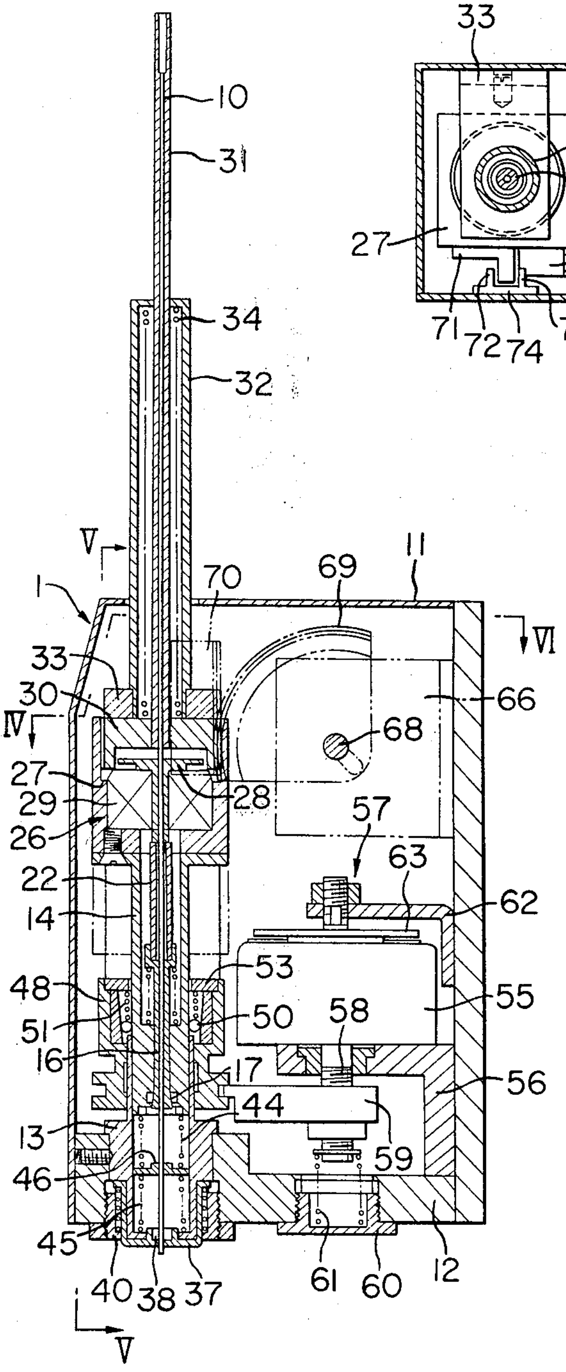
FIG. 3 is a vertical sectional view of the first embodiment of the plotting head according to this invention, showing the state where the lead is located in drawing position.
Figure 4:
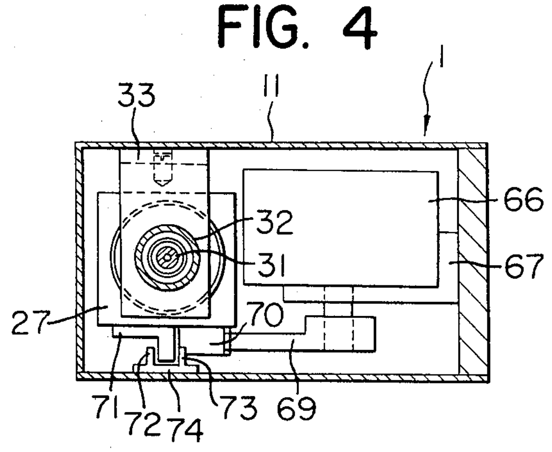
FIG. 4 is a sectional view taken along the line IV—IV of FIG. 3 as seen in the direction of the arrows.
Figure 5:
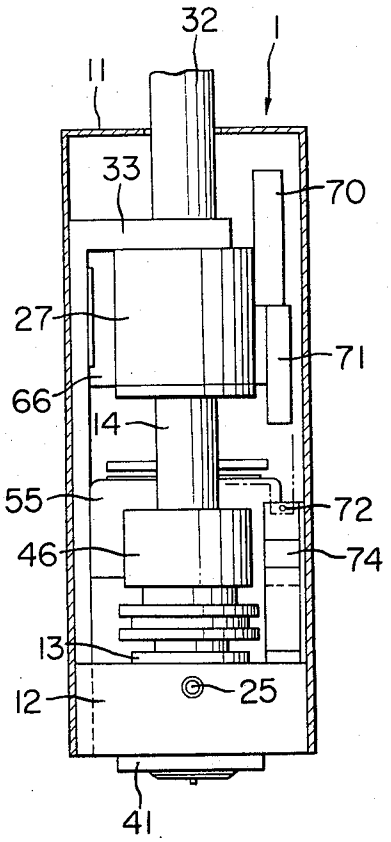
FIG. 5 is a sectional view taken along the line V—V of FIG. 3 as seen in the direction of the arrows.

In FIG. 3, the lower end of a protecting pipe 31 is screwed into the center threaded hole of the casing 27, and the lead 10 passes through said center hole. A spring cover 32 is disposed to cover the protecting pipe 31 and the lower end of said cover is inserted into the threaded hole of a bracket 33 extending upwardly along the inner wall surface of the housing 11 from the base plate 12. Within the cover 32 is received a spring 34 coiled round the protecting pipe 31. This spring 34 is operable to continuously urge the casing 27 and lead holder 14 downwardly, thereby abutting the lead 10 on the surface of a paper.

In FIG. 6, the lower part of the guide pipe 13 is received in a cavity 36, the lower part of which is open, formed at the lower part of the base plate 12, and the lower part of this guide pipe 13 is fitted upwardly with a hood 37 which is open at its upper part. In the central part of the bottom of said hood 37 is formed a cavity within which is received a rubber packing 38, and in the central part of this packing 38 is perforated a lead gripping hole 39 which has a diameter slightly smaller than the outer diameter of the lead 10 and has a friction fit with the lead 10 for gripping purposes.

A fastening cylinder 40 is disposed at the outside of the hood 37, and the threaded portion formed on the outside of said cylinder is fitted into the threaded portion formed on the inner peripheral wall of the cavity 36, which is further secured to the base plate 12 by means of a nut 41. Between the inner peripheral surface of the fastening cylinder 40 and the outer peripheral surface of the hood 37 is formed a cylindrical space within which is received a spring 42. This spring 42 is held by the outward flange at the upper end of the hood 37 and the inward flange at the lower end of the fastening cylinder 40 for absorbing the shock applied onto the surface of a paper by the hood, that is, the lead 10 held by the hood, and regulating the strength of the spring 42 by controlling the degree of screwing the fastening cylinder 40 in the base plate 12. Since the outer diameter of the upper end flange of the hood 37 is larger than the inner diameter of the upper end of the fastening cylinder 40, the upper end of the fastening cylinder 40 functions as a stopper when the hood 37 descends.

In a cavity 43 defined within the guide pipe 13 underneath the lead holder 14 is slidably disposed a lead receiving plate 46 in the center of which is perforated a lead inserting through hole 47. On the upper and lower surfaces of the lead receiving plate 46 there are provided springs 44 and 45 between the lead holder 14 and the guide pipe 13 respectively. This lead receiving plate 46 acts to hold the lead 10 in the center of the cavity 43 at any time when the lead holder 14 descends while holding the lead 10, thereby preventing the lead from being broken between the fastener 16 and the rubber packing 38.

A clutch means 48 is slidably fitted on the upper part of the guide pipe 13, a ring means 49 having an upwardly enlarged tapered inner surface is mounted on the upper part of said clutch means, and above there a cover 53 is threadly secured to the clutch means 48. In the recess defined between the ring means 49 and the lead holder 14 there are received a plurality of balls 50 which are pressed by a spring 51 interposed between the balls and the cover 53. At the lower part of the clutch means 48 there is provided a circular groove 52.

Next, in FIG. 3, numeral 55 denotes a first solenoid installed within the housing 11 by means of a bracket 56, and a rod 58 is connected with an actuator for said solenoid 55. To this rod 58 is attached a lever 59 whose tip engages in the circular groove 52 of the clutch means 46. And, a lift-up spring 61 is interposed between the lower end of the rod 58 and the cap 60 thread-fitted in the base plate 12. Above the solenoid 55 is disposed a stopper 63. Said stopper is attached adjustably to a bracket 62 by means of a bolt nut 57 for regulating the uppermost position of the solenoid actuator.

Numeral 66 denotes a second solenoid of the rotary type installed within the housing 11 by means of a bracket 67 (FIG. 4), and a segment gear 69 is attached to an armature of said solenoid. A rack 70 engaging the gear 69 and a sensing unit blind plate 71 are attached to the casing 27, and a sensing unit 74 is mounted on the base plate 12, said sensing unit being provided with a projecter 72 and a light receiving element 73 which are located on opposite sides relative to the blind plate 71 in its descending extreme position.

The operation of the first embodiment will be explained hereinafter.

(1) In FIG. 6, the third solenoid 26 is turned on for setting the lead 10 in the plotting head 1. The actuator 28 is attracted toward the coil 29 so that the leg portion of the actuator allows the auxiliary guide pipe 22 and fastener 16 to descend against the force of the spring 24. At the beginning of this descending motion the clamping ring 19 descends in one united body with the collet portion 17, but when the ring 19 abuts on the stopper ring 20, the ring 19 is stopped and consequently the collet portion 17 is disconnected therefrom and descends by itself, whereby the collet portion 17 is expanded.

Hereupon the long lead 10 is inserted into the protecting pipe 31 from its upper end, the tip of the lead is allowed to descend within the expanded collet portion 17 against the friction of the rubber packing 38 and when the descending movement of the lead 10 is discontinued at this position the lead is gripped by the packing 38.

When the solenoid 26 is turned off, then, the fastener 16 is thrust up by the action of the spring 24, and the collet portion 17 is pressed by the ring 19 and compressed for clamping the lead 10. The operation of setting the lead 10 in the plotting head is thus completed.

(1) Then, the first solenoid 55 is turned on for moving the lead 10 to a drawing position. By turning on the solenoid 55, the lever 59 attached to the rod 58 descends and the clutch means 48 descends according as the lever descends, too. When the clutch means 48 moves to a position where its lower end abuts the upper end of the guide pipe 13, the contact between ring 49 and ball 50 is discontinued, and the clutch means 48 disengages so that the lead holder 14 is freed. When the lead holder 14 is thus freed, it is allowed to descend within the guide pipe 13, by the pressure of the spring 34, accompanying the fastener 16 which has clamped the lead 10 by the collet portion 17, and the descending movement of the lead holder 14 is stopped when the tip of the lead 10 abuts on a paper, whereby a drawing position is established.

(3) When it is needed to raise the lead 10 to a non-drawing position separated from the paper, it is accomplished by taking the steps contrary to the preceding (2), that is, by turning the solenoid 55 off and re-engaging the clutch means 48 with the lead holder 14 for raising the lead holder 14.

In this connection, it is to be noted that in the processes (2) and (3) the hood 37 moves up and down concurrently, said hood being provided with the packing 38 which is adapted to grip the lead 10.

(4) With the progress of drawing by the lead 10 brought in a drawing position according to the preceding process (2), the lead is consumed gradually and the lead holder 14 also descends in proportion thereto. As the casing 27 is mounted on this lead holder 14 and the rack 70 is mounted on the casing 27, this rack 70 also descends concurrently. Accordingly, the gear 69 engaging the rack 70, since the second solenoid 66 operable to drive said gear is turned off, rotates counterclockwise in FIG. 3 as the rack 70 descends.

The blind plate 71 mounted on the casing 27 also descends concurrently at this time and, when the descending distance reaches a predetermined dimension, moves midway between the projector 72 and light receiving element 73 of the sensing unit 74 to prevent the light receiving element 73 from receiving light. The sensing unit 74, upon sensing this, sends a signal to the second and third solenoids 66, 26. This signal reports that the lead 10 has been consumed to a predetermined degree and accordingly a fresh lead must be pushed out.

When this signal is sent to the solenoids 66, 26 these solenoids are turned on, and the solenoid 55 is also on because the lead 10 is in its drawing position. As the result of solenoids 26, 55 being turned on, the lead 10, as aforesaid, is released from the clamping by the collet portion 17 and accordingly the clutch means 48 disengages the lead holder 14. And, when the remaining solenoid 66 is turned on, the gear 69 turns clockwise for raising the casing, that is, the lead holder 14, and at this time the lead 10, which is held by the packing 38, continues to keep its position.

When the gear 69 returns to its original position, the second and third solenoids 66, 26 are turned off so that on the one hand the lead 10 is clamped at a new position by the collet portion 17 of the fastener 16, and, on the other hand, the gear 69 is freed.

Drawing is conducted by repeating the operation of descending and supplying the lead manually or automatically by means of a conventional controlling circuit such as an electric circuit (not shown). The absence of the lead 10 is devised to be sensed by the number of operations of, for instance, the rotary solenoid 66.

Further, the provision of a plurality of such plotting heads as shown in FIG. 2 permits a continuous long-run drawing in such a manner that the lead in one plotting head is consumed completely and then another plotting head is located in a drawing position.

When the lead 10 is consumed gradually as mentioned above, it is sensed by the sensing unit 74 to thereby allow the lead holder 14 together with the lead receiving plate 46 to descend. However, the descending movement of the lead holder 14 is brought to a halt at the lower limit position of the lead receiving plate 46, and the lead 10 present between the fastener 16 and hood 37 must be cast away as waste lead. Thereupon, the solenoid 26 is turned on, the lead is released from clamping by the collet portion 17 of the fastener 16, a new lead is set, and the waste lead is thrust out of the equipment by said new lead, which is similarly applicable to embodiments 2 to 4. The waste lead inlet 4 and the handling opening 9 shown in FIG. 1 are provided for receiving the waste lead thus thrust out. Their exemplary examples are shown in FIG. 7 to FIG. 9.

Figure 7:
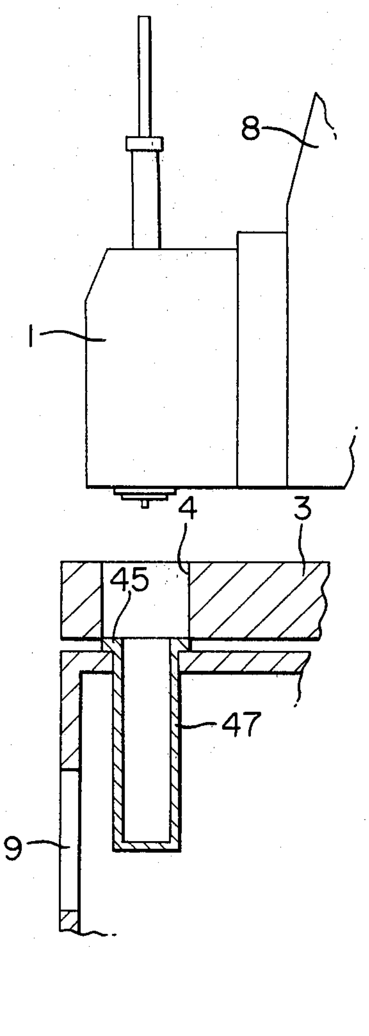
FIGS. 7 through 9 are schematic views illustrating three different embodiments of the rest lead removing means illustrated in FIG. 1.
Figure 8:
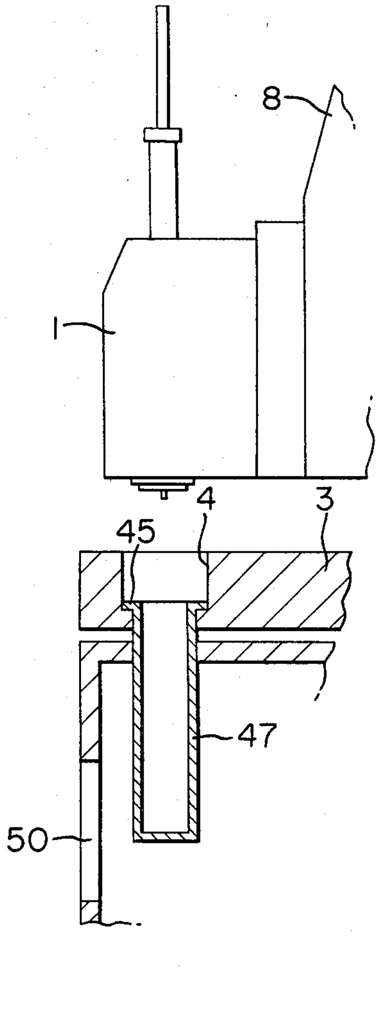
Figure 9:
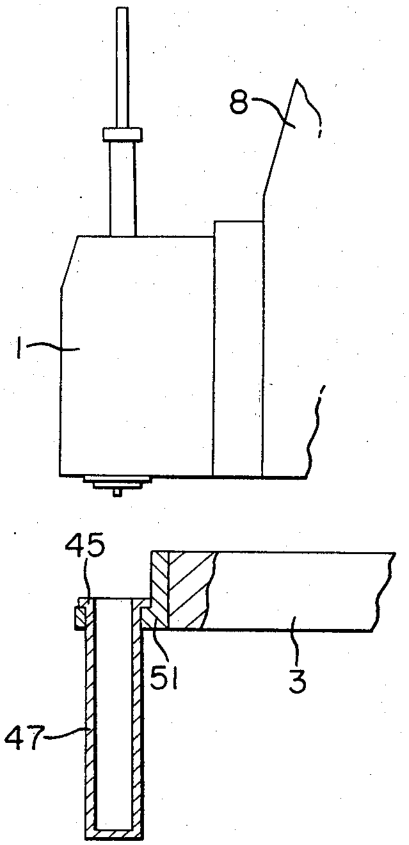

In each figure, numeral 47 denotes a waste lead receiver, those illustrated in FIGS. 7 and 8 being inserted in the through hole perforated on the drawing plate and base plate and secured by the flange 45. And these receivers 47 are designed to be taken out upwards of the drawing plate 3 by the hand inserted through the handling opening 9. The receiver illustrated in FIG. 9 is similarly inserted in the through hole perforated on the outside of the drawing plate 3 and secured by means of the flange 54.

Second embodiment

Figure 10:
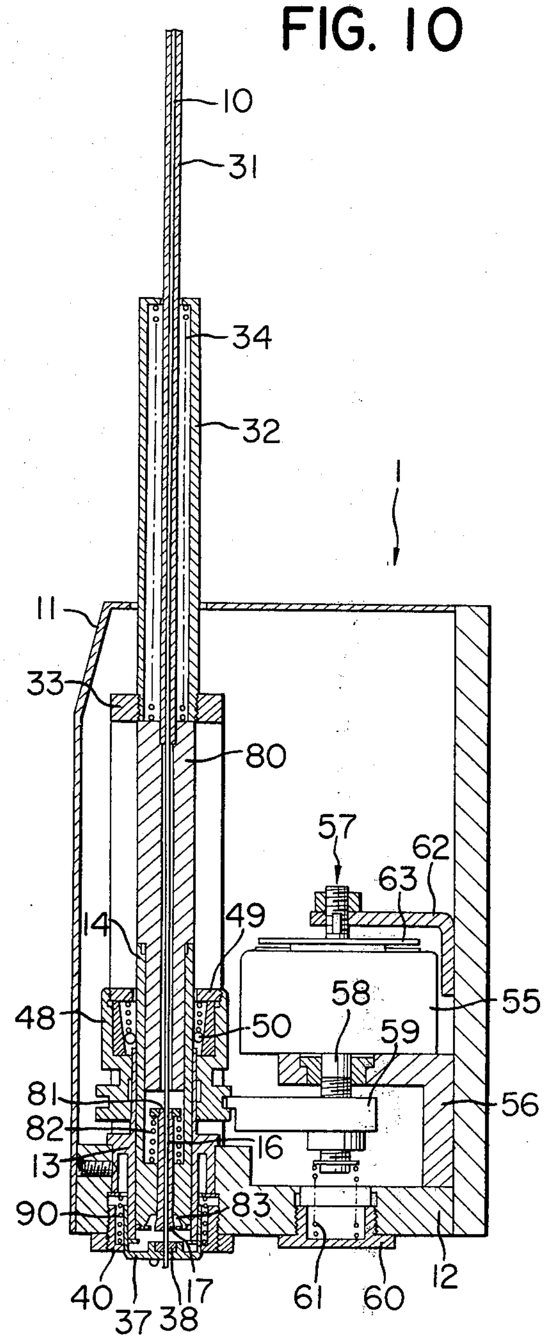
FIG. 10 is a vertical sectional view, similar to FIG. 3, of the second embodiment of the plotting head according to this invention.
Figure 11:
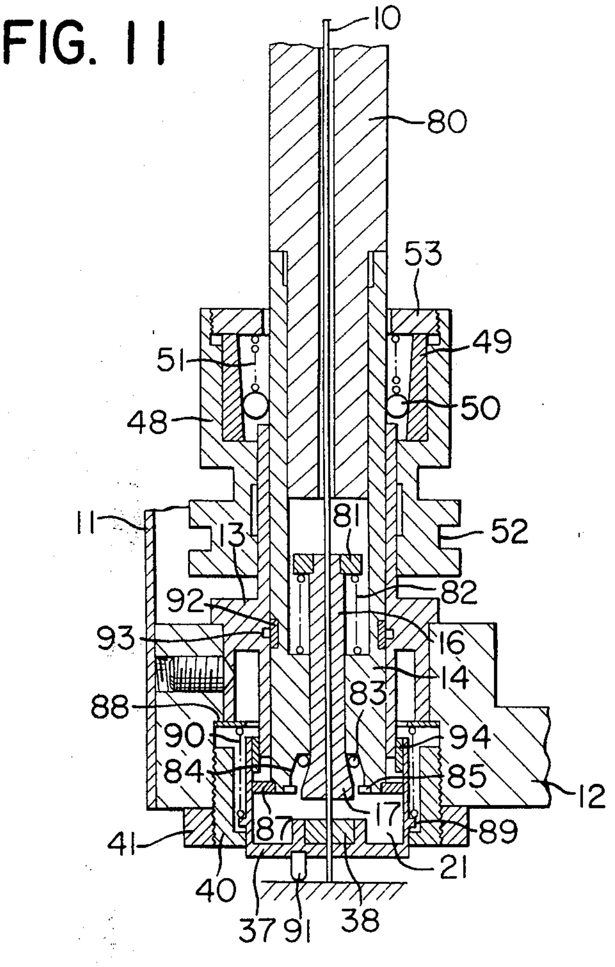
FIG. 11 is an enlarged sectional view, similar to FIG. 6, of a portion of FIG. 10.
Figure 12:
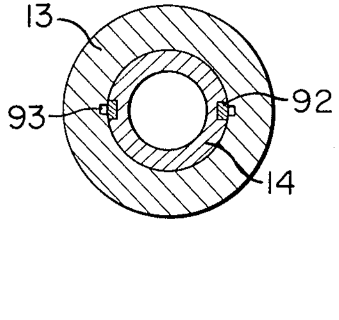
FIG. 12 is a transverse sectional view of a part of FIG. 11.

FIG. 10 to FIG. 12 illustrate the second embodiment of this invention.

A flange 81 is formed on the upper end of the fastener 16. Between the lower face of this flange and the bottom face of the inner hole of the lead holder 14 is interposed a balance spring 82 merely for the purpose of restaining the fastener 16 from descending. A plurality of balls 83 are interposed between the top outer peripheral surface of the collet portion 17 and the inner peripheral surface of a top-cut cone-shaped recess 84 formed at the lower end of the lead holder 14 accomodating the aforesaid outer peripheral surface of the collet portion 17. A stopper ring 85 is provided on the lower end edge of the recess 84 for preventing the balls from falling off, and on the lower end outer periphery is provided a stopper ring 87 which is arranged to engage a stopper ring 94 disposed on the upper end inner periphery of the hood 37 after the lead holder 14 has ascended. The lower part of a holder feed pipe 80 is inserted in the upper part of the lead holder 14 and secured thereto. This pipe 80 allows the lead 10 to pass through the inside thereof and is subject, at its upper end, to the pressure from the spring 34.

The lower part of the guide pipe 13 comprises inner and outer double pipe portions, the lower end of said outer pipe portion being provided with a stopper ring 88, the lower end of said inner pipe portion being located inside the stopper ring 94. A spring 90 is interposed between the ring 88 and an annular flange 89 formed on the lower outer periphery of the hood 37. And, a pin 91 is provided in the lower face of the hood 37 for preventing the paper from being stained by contacting with the hood.

The lead holder 14 is composed of a conductor, a pair of insulators 92 made of a synthetic resin are embedded diametrically opposite on the outer peripheral surface of the lead holder which has sliding contact with the guide pipe 13, and a copper plate 93 is embedded in the inner peripheral surface of the guide pipe 13 opposite thereto. One end of a lead line (not shown) is respectively connected to the lead holder 14 and the copper plate 93 and the other end of said lead line is connected to the first solenoid 55.

Next, explanation will be made on the operation of the second embodiment.

(1) The setting of the lead 10 is made by inserting the lead 10 into the protecting pipe 31. When the lead 10 is inserted into the fastener 16, the lead 10 has friction fit with the fastener 16 and thus the latter descends. The balls 83 fit in the stop ring 85 to thereby be brought to a halt and fit in the small diameter portion of the collet portion 17. Therefore, the collet portion 17 is expanded to release the lead 10. Then, the thus released lead 10 passes through the collet portion 17, extends from the gripping hole of the rubber packing 38 and is gripped by the packing 38. The lead 10 is thus set completely.

(2) Then, in order to bring the lead 10 to a drawing position, the first solenoid 55 is turned on as in Embodiment 1, whereby the lead holder 14 is freed and is lowered by the pressure of the spring 34, while the hood 37 is also lowered by the pressure of the spring 90 and is stopped by abutting of the flange thereof on the bottom surface of the fastening cylinder 40.

The lead 10, which is gripped by the packing 38, stops with the stopping of the hood 37, and the fastener also stops while gripping the lead 10. On the other hand, the lead holder 14 continues to descend despite the stop of the fastener 16 and clamps the lead 10 at the collet portion 17 in the manner of pressing balls 83 on the large diameter portion of the collet portion 17 by the tapered inner peripheral surface of the recess 84.

Thereafter, the lead holder 14 permits the lead 10 held therein to descend, even when the lead 10 does not extend sufficiently from the packing 38, against the gripping force of the packing 38 until the tip of the lead abuts on the paper.

(3) Next, when stopping the drawing operation, the solenoid 55 is turned off. By doing this, as in the first embodiment, the clutch means 48 engages the lead holder 14 and ascend concurrently. At the beginning of this ascending motion, as the lead 10 is gripped by the packing 38, the hood 37 is pressed downwardly by the spring 90 and the collet portion 17 clamps the lead 10, the fastener 16 continues to keep its original position and thus the lead holder 14 alone ascends. Thereafter, however, with the ascendance of the lead holder 14, balls 83 move to the small diameter portion of the collet portion 17, thereby releasing the lead 10 from the clamping by the collet portion 17.

Hereupon, as the fastener 16 ascends together with the lead holder 14 and stops the lead 10 together with the hood 37 until the stopper 87 of the lead holder 14 engages the stopper 94 of the hood 37, the position of the fastener 16 relative to the lead 10 changes during this, and the successive ascendance of the lead holder 14 operates to pull the hood 37 up together with the lead 10 against the force of the spring 90 and move the lead 10 from the drawing position to the non-drawing position.

When the lead holder 14 is allowed to descend in order to move the lead 10 in the non-drawing position again to a drawing position, the hood 37 is also allowed to descend concurrently by the action of the spring 90, and therefore the fastener 16 comes to grip the lead at said changed position, in other words the fastener 16 comes to grip the lead at the upper part by a distance corresponding to the stroke (FIG. 11) between stoppers 87 and 94 in comparison with the gripping position before the pulling-up.

And, during the ascending motion of the hood 37 caused by the ascending motion of the lead holder 14 after the stopper 87 has engaged the stopper for the hood 37, the fastener 16 keeps its freed state, but this freed state prevents the spring 34 from exerting its force on the lead 10 and consequently the lead 10 does not extend from the hood 37 until the hood 37 reaches a position at which to stop its ascending motion.

And, when the lead holder 14 descends, the hood 37 is also allowed to descend concurrently by the action of the spring 90 and the fastener 16 is also in a freed state so that no force of the spring 34 is exerted on the lead 10. Therefore, there is no change in the relative distance between fastener 16 and hood 37 and as a matter of course there is no change in the quantity of the lead to be extended by a fixed stroke as described above.

(4) When the lead 10 is consumed by the drawing operation as mentioned above, the lead holder 14 descends, thereby separating its insulator 92 from the copper plate 93. Accordingly, conductivity is formed between lead holder 14 and copper plate 93. A signal is sent thence to the solenoid 55 and as a result the solenoid 55 is turned off to thereby form a non-drawing condition. However, the solenoid 55 is thereafter turned on and the lead is extended again.

As is evident from the aforegoing, this embodiment is more simplified in construction than the first embodiment in the point that the second and third solenoids are dispensed with.

Third embodiment

Figure 13:
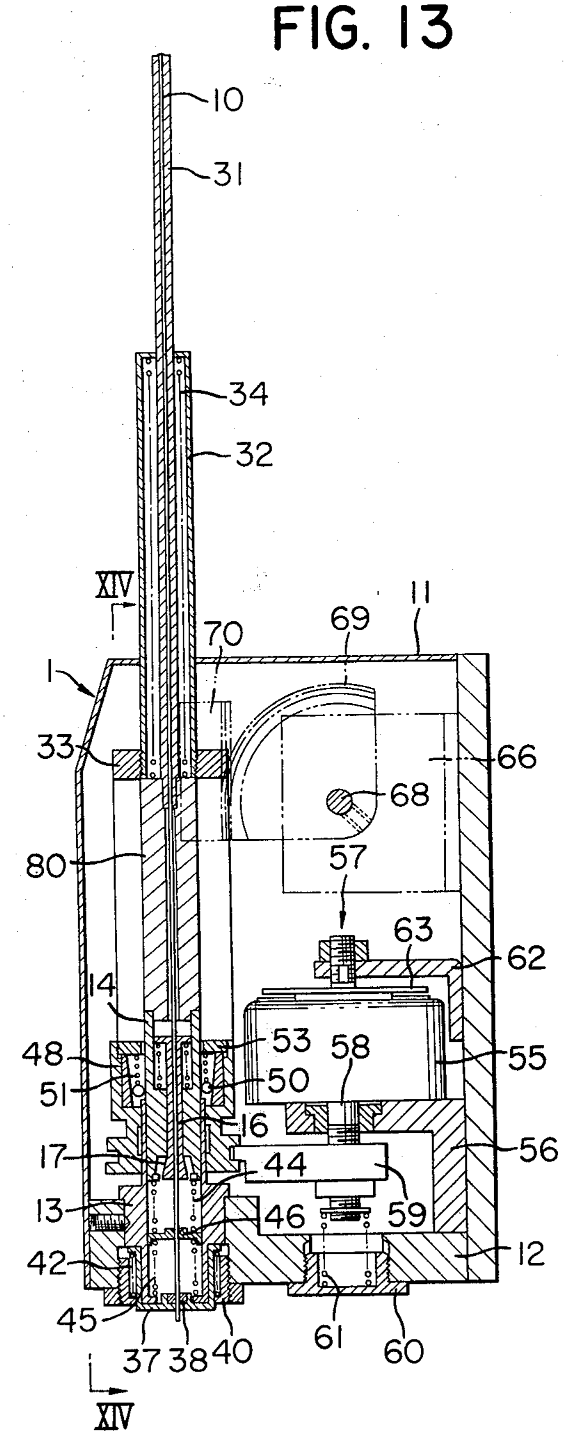
FIG. 13 is a vertical sectional view, similar to FIG. 3, of the third embodiment of the plotting head according to this invention.
Figure 14:
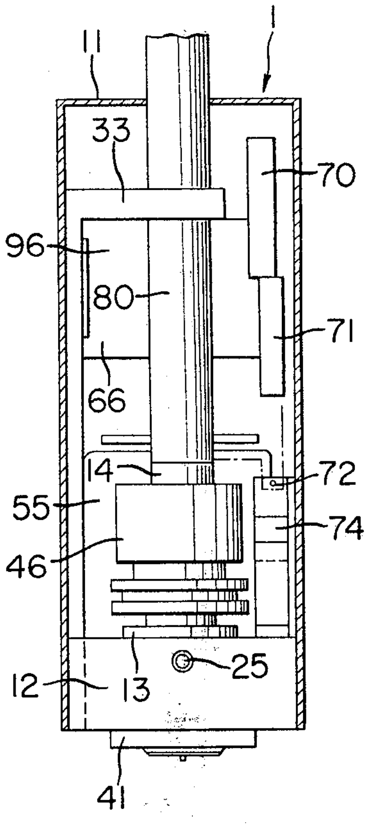
FIG. 14 is a sectional view taken along the line XIV—XIV of FIG. 13 as seen in the direction of the arrows.
Figure 15:
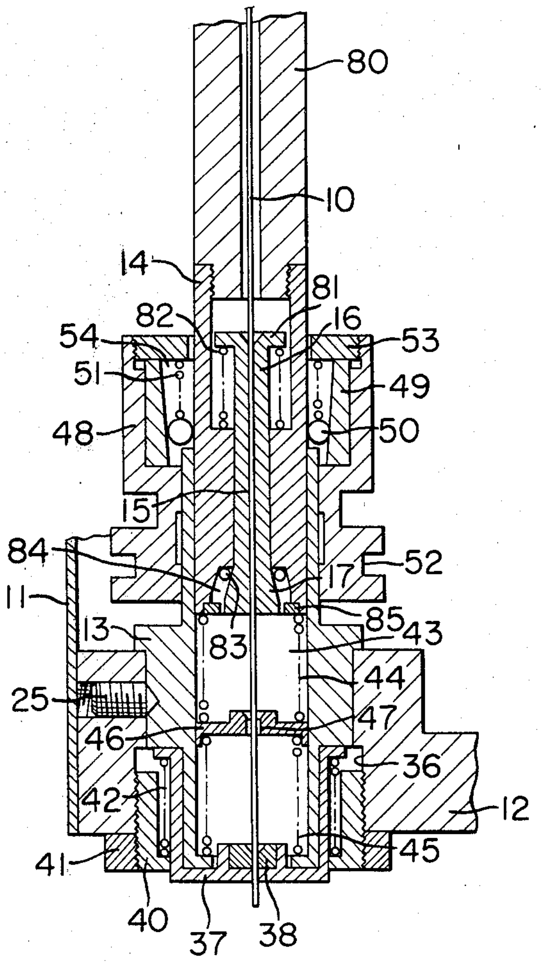
FIG. 15 is an enlarged sectional view, similar to FIG. 6, of a portion of FIG. 13.

FIG. 13 to FIG. 15 illustrate the third embodiment of this invention which comprises the combination of a part of the first embodiment with a part of the second embodiment.

Then, explanation will be made directly on the operation without specifically referring to the construction.

(1) In setting the lead, when the lead 10 is thrust into the gripping hole of the rubber packing 38 of the hood 37 as in the second embodiment, since the packing grips the lead 10 the hood 37 descends and comes to a standstill and thence the lead 10 further extends. When the thrust of the lead 10 is discontinued, the hood 37 is raised by the action of the spring 42 until it abuts on the top wall of the cavity 36 and the lead 10 ascends together with the packing 38 and the fastener 16 which have gripped it. The ascendance of this fastener 16 makes balls 83 press the large diameter portion of the collet portion, whereby the lead 10 is clamped by said collet portion. The operation of setting the lead 10 is thus completed.

(2) Then, the lead 10 is moved to the drawing position in the manner of turning the solenoid 55 on as in the first embodiment of this invention and descending the lead holder 14 by the action of the spring 34.

At the beginning of this descending motion, the hood 37 is put in ascending position by the action of the spring 42, and since the lead 10 has been gripped by the packing 38 and the fastener 16 both the lead 10 and the fastener 16 remain stationery at their original positions.

The subsequent descending motion of the lead holder 14 permits balls 83 to press the collet portion 17 of the fastener 16 at its large diameter portion, whereby the collet portion 17 comes to clamp the lead 10.

With the subsequent descendance of the lead holder 14, the lead 10 clamped by the collet portion 17 of the fastener 16 and the hood 37 with the packing 38 gripping said lead 10 descend, too.

And, the lower face of the upper end flange of the hood 37 fits on the upper end face of the fastening cylinder 40 and comes to a halt and the lead 10 reaches its drawing position where the lead abuts on the paper. However, as the lead holder 14 continues to descend still more, the clamping of the lead 10 by the collet portion 17 is made strong more and more.

(3) Next, in order to bring the lead 10 to a drawing position, the solenoid 55 is turned off and the clutch means is allowed to ascend upon holding the lead holder 14. At the beginning of this ascending motion, the hood 37, while holding the lead 10, ascends together with the lead holder 14 and the fastener 16 by the action of the spring 42, but thereafter the upper end of the hood abuts on the top wall of the cavity 36, whereby the ascending motion of the hood is discontinued. Then, the lead 10, held by the hood 37, comes to a halt at this non-imaging position.

(4) Thereafter, when it is necessary to thrust out the lead 10 after it has been consumed by a predetermined dimension, the sensing unit 74 detects this as in Embodiment 1 and sends a signal to the second solenoid 66 for turning it on. The second solenoid 66 thus turned on allows the segment gear 69 to rotate and ascend until the pipe 80 collides against the holder 33. In order to prevent the lead holder 14 from ascending together with the pipe 80 in this case, balls 50 are thrusted upwards against the force of the spring 51, thereby disengaging the clutch means. Due to this, the lead holder 14 is allowed to ascend successively by the action of the segment gear 69.

In this case, as the hood 37 also ascends together with the lead holder 14 by the force of the spring 42, the relative relationship between the fastener 16 and the lead holder 14 remains unchanged, namely the fastener 16 keeps clamping the lead 10 and ascends together with the lead holder 14.

Then, when the hood 37 collides against its ascending extremity and comes to a halt, the fastener 16 also stops but the lead holder 14 alone ascends. Therefore, the relative positional relationship between the fastener 16 and the lead holder 14 changes, thereby releasing the lead 10 from the clamping by the fastener 16. The fastener 16, which is supported by a balance spring 82, thenceforth continues to ascend together with the lead holder 14.

Due to this, the clamping position of the lead 10 by the fastener 16 is changed.

And, after the lapse of a fixed period of time the solenoid 66 is off and the segment gear 69 thus stops its rotation into a freed state.

The lead holder 14 is then allowed to descend by the pressure of the spring 34, but the hood 37 is located at the upper stopping position by the spring 42. Accordingly, the fastener 16 has friction fit with the lead 10 to be stopped. Therefore, the relative positional relationship between the fastener 16 and the lead holder 14 changes, namely the fastener 16 comes to clamp the lead holder 14.

As the lead holder 14, even when clamped by the fastener 16, still continues to descend, the hood 37 is also allowed to descend against the force of the spring 42 by the friction between the lead 10 and the packing 38.

When the hood 37 comes to a halt at the lower stopping position, the lead 10 is stopped by the contact of its tip with the paper surface, whereby the lead 10 is completely clamped by the fastener 16 and the drawing position can be maintained.

The replacing operation of a new lead is effected by detecting the absence of the lead, for instance, by the number of operations of the solenoid 66 after the above mentioned operations have been repeated.

Fourth embodiment

Figure 16:
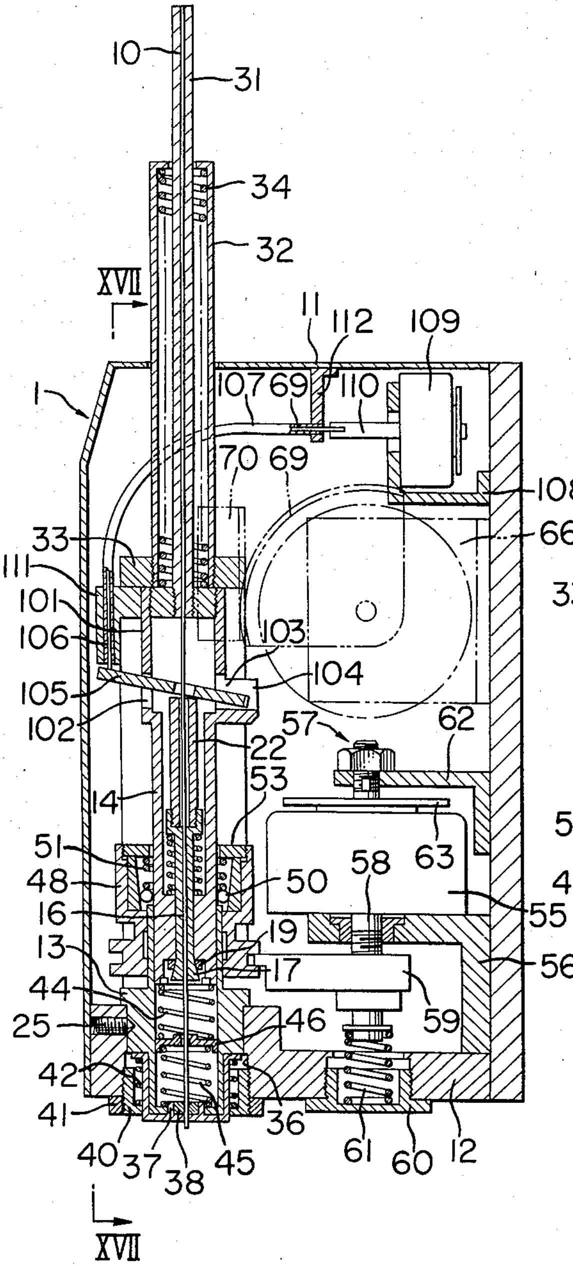
FIG. 16 is a vertical sectional front view, similar to FIG. 3, of the fourth embodiment of the plotting head according to this invention.
Figure 17:
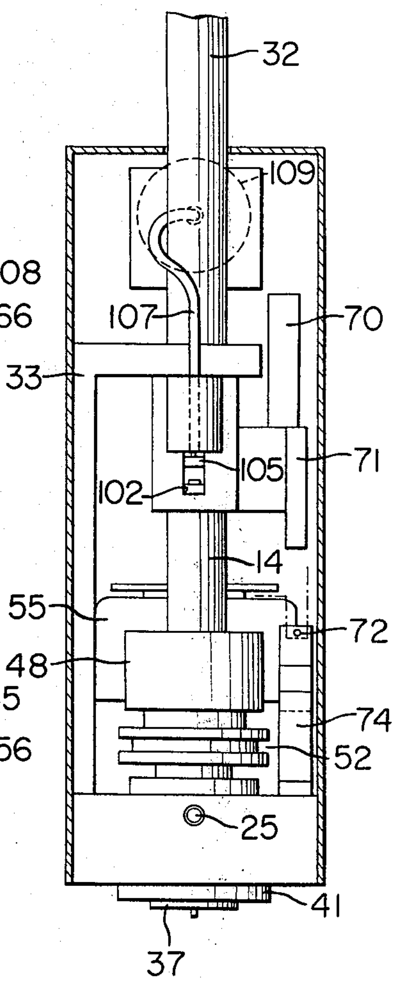
FIG. 17 is a sectional view taken along the line XVII—XVII of FIG. 16 as seen in the direction of the arrows.

FIGS. 16 and 17 illustrate the fourth embodiment of this invention comprising partial modification of the first embodiment.

Explanation will be made on the modified portion.

At the upper part of the lead holder 14 is formed a large diameter portion 101, at the lower part thereof are perforated a pair of enlarged holes 102 and 103 diametrically opposite to each other, and outsides of the large diameter part 101 containing one enlarged hole 103 is formed a bracket 104. And, a lever 105 is pivotally supported at its base end on this bracket 104, and this lever 105 passes through the enlarged holes 102 and 103 and engages, at its middle back, the upper end of the auxiliary guide pipe 22. One end of a wire 106 abuts the end upper surface of this lever 105, said wire 106 being received slidably in a flexible guide tube 107 provided by the aid of a bracket 111 attached to the lead holder 14 and a bracket 112 attached to the housing 11, and the other end of said wire 106 is connected with an actuator 110 for a solenoid 109 mounted on a bracket 108.

The difference between this embodiment and the first embodiment as mentioned above, namely consists only in that in the first embodiment the fastener 16 is thrusted down by the aid of the leg portion of the actuator 28 for the solenoid 26 while in this embodiment it is done by the aid of the wire 106 and the lever 105. As a matter of course, therefore, the ascending, descending, thrusting out operations for the lead 10 are carried out through the same procedure as mentioned in the first embodiment.

Fifth embodiment

Figure 18:
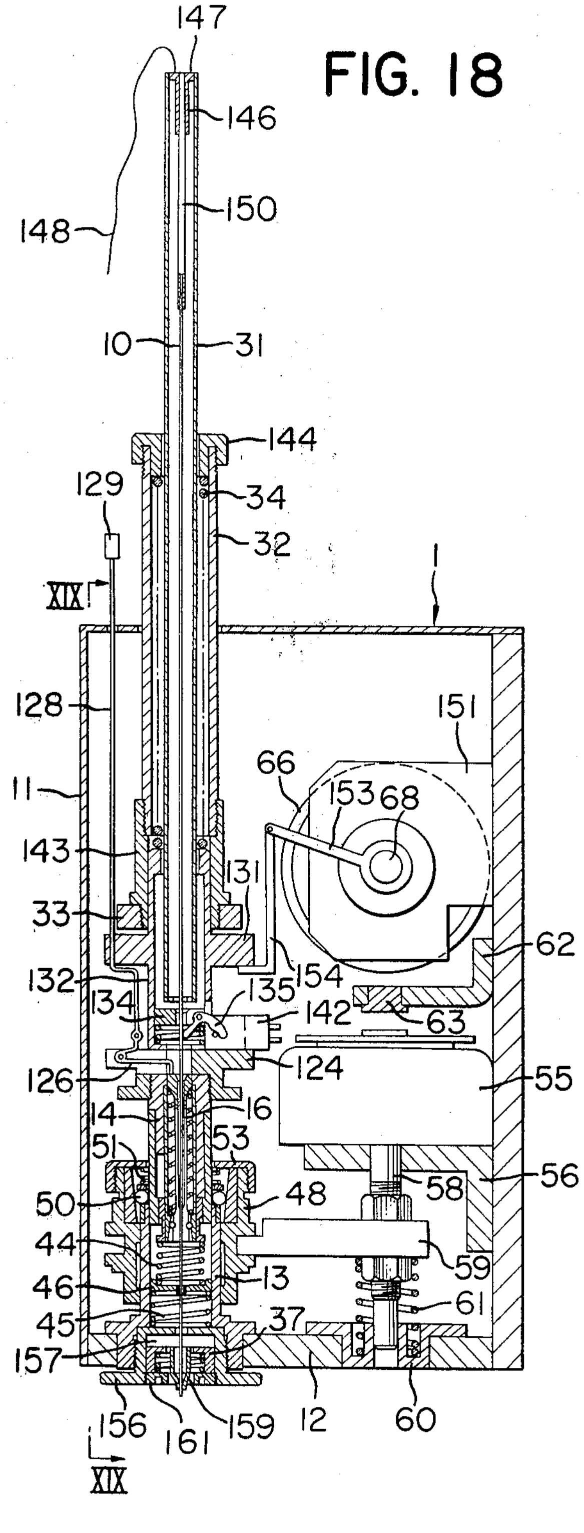
FIG. 18 is a vertical sectional front view, similar to FIG. 6, of the fifth embodiment of the plotting head according to this invention.

FIG. 18 and following illustrate the fifth embodiment of this invention. This embodiment comprises wide modifications of the other embodiments, and accordingly explanations will be made on the modified portions.

Figure 20:
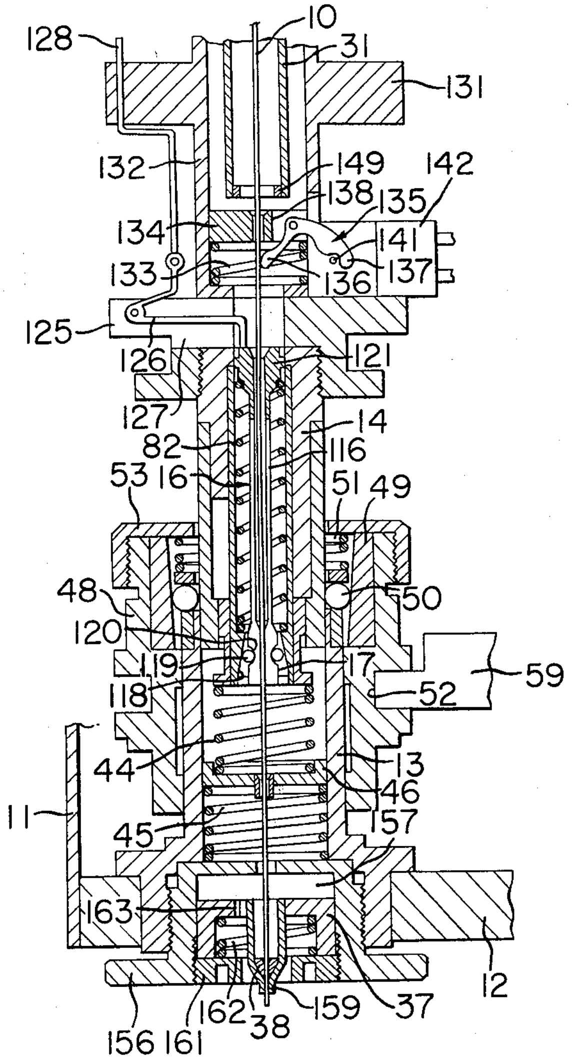
FIG. 20 is an enlarged sectional view, similar to FIG. 6, of a portion of FIG. 18.

The lead holder 14, as is best apparent from FIG. 20, is slidably fitted with the fastener 16 which is provided with a plurality slits 116 formed longitudinally from the upper part to the lower end thereof and is provided at its lower end part with the large diameter collet portion 17. The portion of the lead holder 14 opposite to said collet portion 17 is formed into a top-cut cone shaped recess 118. In the substantially middle part of the collet portion 17 is formed a circular groove 120. A plurality of balls 119 are put in this groove, said balls 119 being disposed to contact the wall surface of the recess 118.

The balance spring 82 is disposed in the recess formed between the upper end flange 121 of the fastener 16 and the lower end stepped portion of the cavity 122 of the lead holder 14, said spring being operable to hold the fastener 16 within the lead holder 14.

A supporting disc 124 with a center hole is mounted on the upper end of the lead holder 14. Said disc is provided with a radial slit 125 in which is fitted the base end of a bell crank 126. The upper and lower ends of the cross lever of this bell crank are respectively curved substantially perpendicularly to the vertical direction. The lower end vertical portion 127 thereof abuts on the upper end surface of the fastener 16. The upper end vertical portion thereof is inserted into the housing 11 from the outside and is pivotally connected to the lower end of a vertically movable handling rod 128. Numeral 129 denotes a handling nob. In place of the bell crank 126 there may be employed a lever supported pivotally in the middle.

On the upper part of the disc 124 is mounted a sensing lever holding cylinder 132 provided with a flange 131 in the middle. And, within the lower end portion of said cylinder is slidably disposed a supporting plate 134 supported by a spring 133. And, this supporting plate 134 is provided with a radial slit 138 into which a sensing lever 135 having a contact lever 136 and a blind lever 137 is inserted and is pivotally supported in the middle. The lever 136 is located opposite to the lead 10 and the lever 137 is made heavier than the lever 136 so that the lever 136 may contact the lead 10.

A sensing unit 142 having a projecter 141 and a light receiving element (not shown) is disposed at the upper portion of the disc 124 as well as on the side of the lever 137, and the blind lever 137 is designed to move between the projecter and the light receiving element and to release the photo sensing unit while the lever 136 contacts the lead 10 but blind the photo sensing unit while the lever 136 is disconnected from the lead 10.

Figure 19:
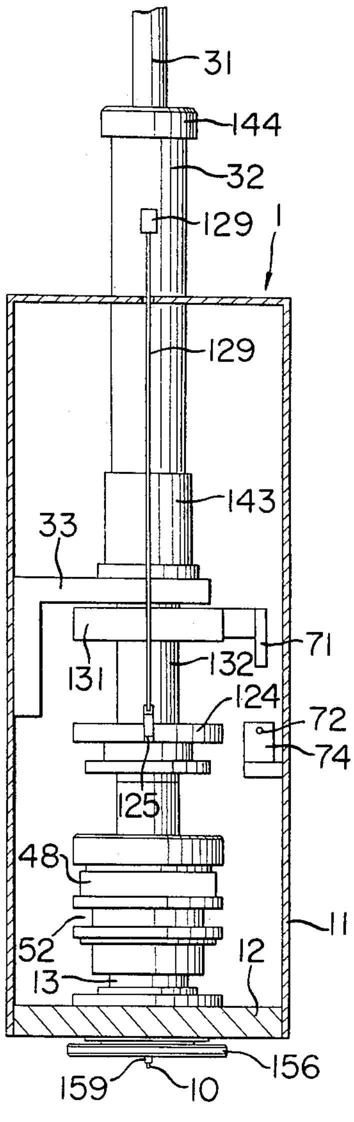
FIG. 19 is a sectional view taken along the line XIX—XIX of FIG. 18 as seen in the direction of the arrows.

In FIG. 19 the upper part of the holding cylinder is slidably inserted into a connecting cylinder 143 mounted detachably on the bracket 33, the spring cover 32 is mounted detachably on the upper part of this connecting cylinder 143, and a cap 144 is mounted detachably on this cover 32.

The projecting pipe 31 is pressed into this cap 144, and the spring 34 surrounding said pipe is restrained by both the lower surface of the cap 144 and the upper surface of the holding cylinder 132. The protecting pipe 31 is provided slidably with a flange 147 of a guide tube 146 onto the lower end of which the upper end of a long lead support 150 held the lead 10 therein is fitted and secured. A rope 148 is attached to this flange 147 and the lower end of the protecting pipe 31 is provided with a flange 149. It is to be noted that said rope 148 may be dispensed with in this case.

The flange 131 of the holding cylinder 132 is held by a hanging hook 154 secured to the fore end of a lever 153, the latter being mounted on the armature shaft 68 of the rotary type second solenoid 66 supported by a bracket 151.

In FIG. 20, a hat shaped spring support 156 is screwed into the the lower opening of the guide pipe 13, the underwardly opening hood 37 is received slidably in the cavity 157 of the spring support 156, an inverted bottle shaped packing holder 159 is fitted in the center hole formed in the top wall of this hood 37, the rubber packing 38 is filled in the vicinity of the lower end of the holder 159. The hood 37 is supported by a supporting plate 161 screwed into the spring support and a spring 162 is received in the cavity of the hood 37. By controlling the position of the supporting plate 161 relative to the spring support, the distance between the packing holder 159 and the paper can be regulated.

Figure 22:
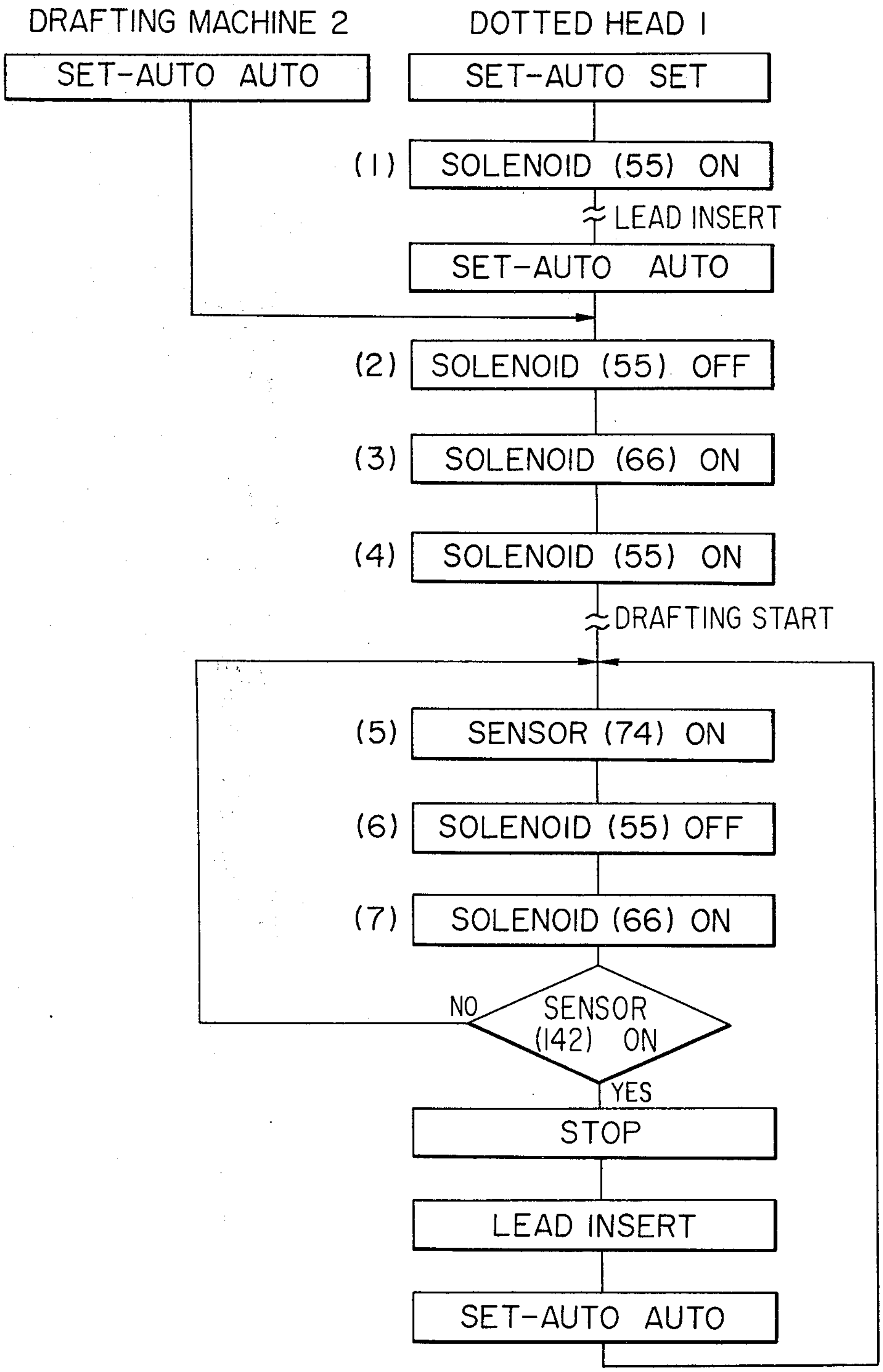
FIG. 22 is an acting sequence diagram of the embodiment illustrated in FIG. 18.

Next, the operation of the fifth embodiment will be explained with reference to the sequence diagraph illustrated in FIG. 22.

(1) Prior to the setting of a lead, the first solenoid 55 is turned on and the lead holder 14 is thereby allowed to descend as in the other embodiments. The reason is that if the lead 10 is inserted into the lead holder 14, while being in elevated position, to such a degree that the lead 10 is thrusted out below the packing holder 159, there will be a danger of the lead 10 being damaged, depending on the quantity of the lead 10 thrusted out, because the lead holder 14, when allowed to descend thereafter, is liable to continue to descend even after the lead 10 has contacted the surface of the paper, and said danger must be removed.

On the other hand, the lead 10 is pressed into the lead support 146, which has been pulled out of the protecting pipe 31 in the manner to be referred to hereinafter, and the same is inserted into the protecting pipe 31. The thus inserted lead 10 descends, accompanying the fastener 16, within the lead holder 14 and the collet portion 17 is released from the pressure caused by balls 119 and thus expanded. Therefore, the lead 10 passes through the thus expanded collet portion 17, then passes through the holding hole of the packing 38 and reaches the surface of the paper. As the packing 38 holds the lead 10 at this time, the hood 37 descends to the position indicated in FIG. 20 against the force of the spring 162.

(2) When the plotting head 1 is arranged to be operated automatically thenceforth, the first solenoid 55 is turned off to thereby allow the lead holder 14 to ascend as in other embodiments. With this ascendance, the hood 37 is also allowed to ascend by the action of the spring 162, and at the same time the lead 10 held by the packing 38 also ascends. This ascending motion continues until the hood 37 comes to contact with the top wall of the cavity 157, and hereby the lead 10 is stopped together with the fastener 16 and the hood 37.

(3) Hereat, the second solenoid 66 is turned on so that the hook 154 engages the flange 131 of the cylinder 132 to thereby raise the latter, and the lead holder 14 ascends which is attached to the cylinder 132 by the aid of the disc 124. Consequently, the lead 10 is released from the clamping by the collet portion 17, and thenceforth the fastener 16 ascends together with the lead holder 14.

(4) Next, the lead 10 is moved to its drawing position by turning the first solenoid 55 on as already explained in the third embodiment. In particular, the lead holder 14 is thereby moved to its drawing position accompanying the lead 10 by the action of the spring 34 and thereafter the lead 10 is clamped by the collet portion 17.

(5) When the lead 10 is consumed to a predetermined dimension with the proceed of the drawing operation, the sensing unit 74 in FIG. 19 detects this, (6) the first solenoid 55 is turned off and (7) the second solenoid 66 is turned on.

The operations in (6) and (7) are identical with those in the preceding (2) and (3).

Figure 21:
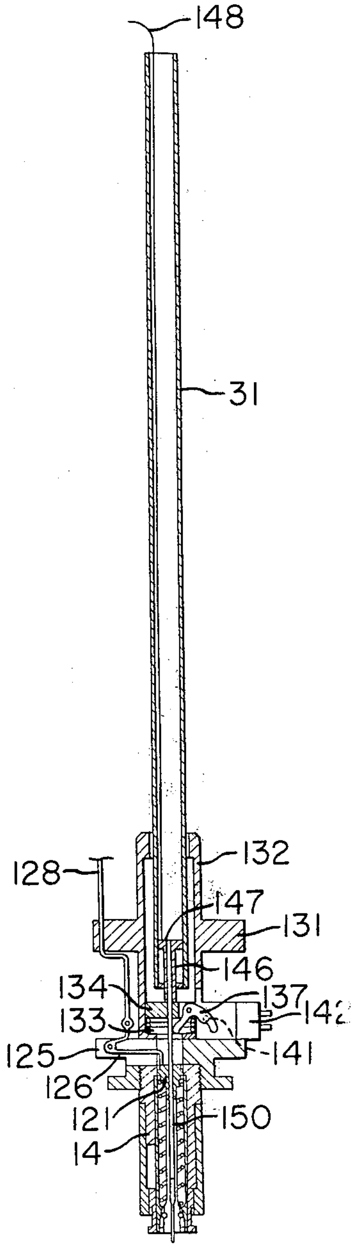
FIG. 21 is a partly sectional view of the embodiment illustrated in FIG. 18, showing the state where the lead support is located at the lowest position.

(8) As a result of the lead 10 being thrusted out in proportion to the consumption of the lead 10, the lead support 150 descends within the protecting pipe 31 together with the tube 146 and, when the lower end of the tube 146 contacts the supporting plate 134, forces said plate to descend against the force of the spring 133. The sensing lever 135 also descends together with said plate. As a result of this, the blind lever 137 shields the light from the projector 141 as in the case where the lever 136 does not contact with the lead 10 (FIG. 21), and the sensing unit 142 is actuated to send a signal to an alarm machine or a drawing regulator (not shown).

(9) Consequently, warning is issued and the operation is discontinued.

(10) Thereupon, the lead setting operation as mentioned above is effected and the drawing operation is repeated.

In this embodiment, in order to set a new lead the rest lead must be removed first of all. For this purpose, the rod 128 is lowered with the nob 129, thereby the fastener 16 being lowered to releave the lead 10 from the clamping by the collet portion 17, and then the protecting pipe 31 is pulled out upwardly. The flange 149 of the projecting pipe 31 is thereby brought into contact with the flange 147 of the lead support 146, whereby the lead support 146 is pulled out together with the protecting pipe 31 and thus the rest lead is removed. Since the lead is held by the long support 150 in this case, the more this support 50 is prolonged, the more the length of the rest lead can be reduced.

In removing the rest lead, furthermore, said operation can be readily effected by making use of a rope attached to the flange 147.

It should be understood that the above mentioned embodiments are intended only to clarify this invention but not to unduly limit the scope of the following claims. For instance, the spring 34 for thrusting the lead out may be replaced by a heavy weight, torque motor or air motor. The first solenoid 55 may be replaced by another member such as motor cam, air pressure-utilizing machine or the like. The second solenoid 66 may be replaced by a pressure spring, heavy weight, air motor, cam or the like. Additionally, the sensing units 74 and 142, balance spring 82, etc. may be replaced by any ones capable of exhibiting the same performances.

What is claimed is:

1. A plotting head for supporting a lead for selective engagement with a drafting sheet in a drawing machine, comprising:

- a housing supported on said drawing machine;
- a lead holder supported on said housing for movement relative thereto toward and away from the drafting sheet in a vertical direction;
- a collet supported on said lead holder for vertical movement relative thereto between a first upper position and a second lower position, said collet having a central vertical opening for receiving the lead;
- first means for effecting movement of said collet between said first and said second positions;
- second means for actuating said collet as said collet moves to said first position, said collet being in gripping engagement with the lead in said first position and being free of gripping engagement with the lead in said second position;
- bias means for continuously and yieldably urging said lead holder downwardly;
- selectively actuable third means cooperable with said lead holder for effecting upward movement of said lead holder against the urging of said bias means, said third means including an actuator supported for reciprocal vertical movement and clutch means cooperable with said lead holder and said actuator for transmitting only upward movement of said actuator to said lead holder;

lead gripping means supported on said housing adjacent the lower end thereof for frictionally engaging said lead to yieldably resist vertical movement of said lead;

whereby when said collet is in said first position and said third means is deactuated, said collet grips the lead and said bias means urges said lead holder and said collet downwardly, thereby urging the lead into engagement with the drafting sheet.

2. The plotting head of claim 2, wherein said housing includes an upright substantially cylindrical guide pipe, said lead holder being substantially cylindrical and being slidably supported in said guide pipe for vertical movement therein, said clutch means including a clutch ring encircling said guide pipe near the upper end thereof and having an inwardly facing and upwardly diverging tapered surface, a plurality of circumferentially spaced balls disposed between said tapered surface and the outer surface of said lead holder, and resilient means yieldably urging said balls downwardly, and wherein said actuator operatively engages said clutch ring for moving same vertically.

3. The plotting head of claim 3, including a lead receiving plate movably supported in said housing between said lead holder and said lead gripping means and having an opening therein through which said lead extends, and including a first helical compression spring disposed between and engaging said lead holder and lead receiving plate and a second helical compression spring disposed between and engaging said lead receiving plate and a portion of said housing located therebelow.

4. A plotting head according to claim 1, including sensing means responsive to movement of said lead holder for issuing a signal upon sensing that said lead holder has descended to a predetermined position, and fourth means responsive to said signal for moving said lead holder upwardly upon receiving said signal from said sensing means.

5. A plotting head according to claim 1, wherein said lead gripping means includes a hood supported for vertical movement over a fixed distance within a cavity formed in said housing, spring means in said cavity for continuously urging said hood downwardly, said hood including an elastic packing having a through hole for receiving and frictionally gripping the lead close to the lower end thereof.

6. A plotting head according to claim 1, wherein the lower end of said collet has a downwardly flaring shape, is provided with circumferentially spaced vertical slits and is disposed within a cavity formed in the bottom of said lead holder, and wherein said second means includes compression means disposed within said cavity for radially compressing said collet when said collet moves upwardly relative to said lead holder and for releasing said collet from said radial compression when said collet moves downwardly relative to said lead holder.

7. A plotting head according to claim 1, wherein said first means comprises spring means disposed between said collet and said lead holder for continuously urging said collet upwardly relative to said lead holder, and selectively actuable fifth means for moving said collet downwardly relative to said lead holder.

8. A plotting head according to claim 1, wherein said first means comprises a balance spring provided between said collet and said lead holder.

9. A plotting head according to claim 1, including a cover extending vertically upwardly above said housing, said cover having a lead support therein, said lead support having at the lower end thereof a long cylindrical portion having a through hole in which the upper end of the lead can be inserted and having at the upper end thereof a flange slidable along the inner circumferential surface of said cover.

10. A plotting head according to claim 1, wherein said housing includes a guide pipe, wherein said lead holder is made of a conductive material and is slidingly fitted in said guide pipe, including an insulator embedded in a part of the outer circumferential surface of said lead holder and a conductor embedded in the inner circumferential surface of said guide pipe, one end of a first lead wire being connected to said lead holder and one end of a second lead wire being connected to said conductor embedded in the inner circumferential surface of said guide pipe, and wherein said first means includes a solenoid, the other ends of said lead wires being electrically coupled to said solenoid and turning said solenoid off when said lead holder moves downwardly sufficiently to electrically separate said lead holder and said conductor from each other.

11. A plotting head according to claim 1, further comprising an operation rod supported for vertical movement in said housing and engaging said collet, downward movement of said operation rod effecting movement of said collet downwardly relative to said lead holder.

12. A plotting head according to claim 1, wherein said third means includes a solenoid having a vertically movable actuating shaft and including resilient means for yieldably urging said actuating shaft upwardly, said actuating shaft being moved downwardly against the urging of said resilient means by the action of said solenoid when said solenoid is energized, said actuator being provided on said actuating shaft and being a horizontal lever whose tip operatively engages said clutch means.

13. A plotting head according to claim 4, wherein said sensing means includes a sensing member supported on said lead holder and a photo sensing unit which is shielded from a light source by said sensing member when said lead holder has descended to said predetermined position.

14. A plotting head according to claim 4, wherein said fourth means includes a rotary solenoid and a segment gear mounted on the shaft thereof, and wherein said segment gear engages a rack connected to said lead holder and moves said rack and lead holder upwardly when said solenoid is energized.

15. A plotting head according to claim 4, wherein said fourth means includes a rotary solenoid, a lever on the shaft thereof and a hanging hook connected to said lever, and wherein said hanging hook engages a flange provided on said lead holder to thereby move said flange and lead holder upwardly by the action of said solenoid.

16. A plotting head according to claim 7, wherein said fifth means includes a solenoid mounted on the upper part of said lead holder and having an actuating shaft which engages said collet and is moved downwardly by the action of said solenoid, thereby moving said collet downwardly.

17. A plotting head according to claim 7, wherein said fifth means includes a solenoid having one end of a wire connected to its actuating shaft, and wherein said lead holder includes a lever having one end pivotally supported on said lead holder and its bottom surface engaging the upper end of said collet, the other end of said wire engaging the other end of said lever.

18. A plotting head according to claim 12, wherein the upward stroke of said actuating shaft is limited by adjustable stopper means mounted above said actuating shaft.

19. A plotting head according to claim 4, wherein said sensing means includes a vertically movable supporting plate supported by a spring, said plate having rotatably supported thereon a sensing lever engageable with said lead and movable to a position shielding a photo sensing unit from a light source, said sensing lever shielding the photo sensing unit only when free of engagement with said lead.

20. A plotting head for supporting a lead for selective engagement with a drafting sheet in a drawing machine, comprising a housing attachable to the drawing machine; a vertical lead holder supported for vertical movement within said housing and having a vertical through hole; an elongated vertically upwardly extending cover supported on said housing above the upper end of said lead holder; a protecting pipe affixed to the upper end of said lead holder and extending vertically upwardly thereabove, said protecting pipe extending through and vertically upwardly beyond the upper end of said cover so that an elongated lead can be fed vertically downwardly through said protecting pipe; biasing means mounted within said cover for continuously urging said lead holder downwardly; an elongated vertical tube extending through said vertical through hole in said lead holder and supported for vertical movement in said through hole, said tube being adapted to receive the lead therethrough, said tube having a collet at its lower end, means for clamping said collet against the lead when said tube is moving upwardly within said lead holder and means for releasing the lead when said tube is moving downwardly within said lead holder; lead gripping means mounted at the lower end of said housing for vertical movement with respect thereto, said lead gripping means being adapted to grip the lower end of the lead; and a first actuating means for raising said lead holder, relative to the lead, against the biasing force of said biasing means.

* * * * *

UNITED STATES PATENT AND TRADEMARK OFFICE
CERTIFICATE OF CORRECTION

PATENT NO. : 4 346 392

DATED : August 24, 1982

INVENTOR(S) : Taketo Isobe et al

It is certified that error appears in the above—identified patent and that said Letters Patent is hereby corrected as shown below:

Column 15, Line 26; change "claim 3" to ---claim 1---.

Signed and Sealed this

*Twenty-sixth* Day of *October 1982*

[SEAL]

*Attest:*

GERALD J. MOSSINGHOFF

*Attesting Officer* *Commissioner of Patents and Trademarks*